W. A. PITT.
Sewer-Trap.
No. 207,676. Patented Sept. 3, 1878.
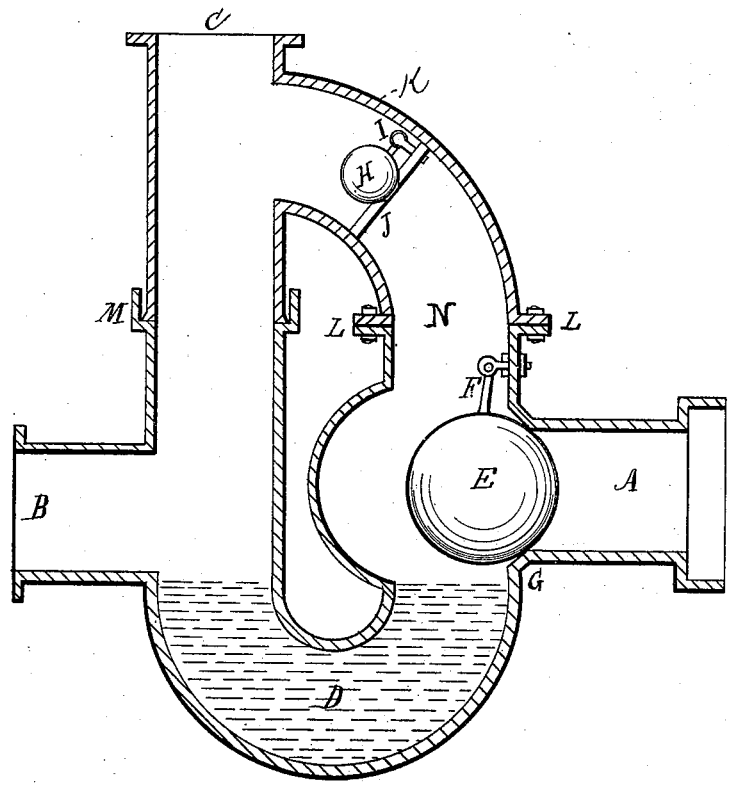

UNITED STATES PATENT OFFICE.

WILLIAM A. PITT, OF NEW YORK, N. Y., ASSIGNOR TO EMMA TRACY, OF SAME PLACE.

IMPROVEMENT IN SEWER-TRAPS.

Specification forming part of Letters Patent No. 207,676, dated September 3, 1878; application filed April 1, 1878.

*To all whom it may concern:*

Be it known that I, WILLIAM A. PITT, of the city of New York, in the county and State of New York, have invented certain new and useful Improvements in Traps for Sewer-Pipes, which improvements are fully set forth in the following specification and drawing accompanying same.

My invention consists in certain improvements in the main house-trap, to more effectually prevent back-pressure of sewer-gas and of tide-water, evaporation of the water in the trap, compression of air in the house-pipes between the traps, and the siphonage out of the water in the trap.

The accompanying drawing will more fully explain the nature of my improvements, such drawing representing a longitudinal central section of a main house-trap containing my improvements.

A is the house end or inlet of trap; B, the sewer end or outlet of trap; C, hand-hole, to be kept tightly covered; D, dip of the trap; E, ball-valve to prevent escape of sewer-gas into house-pipes and back-pressure, to be made of any desired material; F, connections for suspending ball-valve E in bevel-seat; G, bevel-seat for ball on outlet A; H, valve, of rubber or other material, in ball or other convenient shape; I, connections suspending ball-valve H in its seat; J, brass disk with seat for the ball-valve H; K, flanged branch pipe, with hand-hole connecting with flange of trap at L L, and hub portion at M; N, passage connecting both the inlet and the outlet sides of the trap, in which passage is placed the ball-valve H.

When the trap is empty or dry from not having been used, or from evaporation, the ball-valve E, that is suspended at the point F, by its own weight, crowds itself into the bevel-seat G in the inlet-pipe A, and prevents any escape of sewer-gas beyond it. When the dip D in trap is filled with water, this of course makes a perfect seal, and the ball E makes it doubly secure, and keeps back all gas that may percolate through the body of water in the trap.

When there is any tendency to a siphonage of water out of the trap from any one of the many causes, the ball H, suspended at L, opens, as well as the ball E, by reason of which air is at once drawn into the sewer and the vacuum destroyed. This is because it takes less atmospheric pressure to displace the two balls than it does to displace the amount of water in dip of trap.

When a body of water is let down into any of the waste-pipes connected with the main drain-pipe, the air between such waste-water and the trap is not compressed, but it is forced out through the two ball-valves E and H, and passes to the sewer, and thus obviating its escape through the other traps in the building, which escape of gas through such other pipes is usually perceived by the attendant gurgling noise it makes in passing up such traps into the basins, &c.

I claim—

1. A passage in the trap connecting both sides of the trap, in combination with the ball-valve E, suspended by the connections F upon the bevel-seat G, substantially as described.

2. A passage in the trap connecting both sides of the trap, in combination with the ball-valve H, substantially as described.

3. The ball-valve H, suspended in the passage of the trap at I, in combination with the ball-valve E, substantially as described.

WILLIAM A. PITT.

Witnesses:
JAMES H. HUNTER,
CHARLES A. SEELEY.